Oct. 27, 1931.      R. J. WENSLEY      1,829,427
AUTOMATIC HYDROELECTRIC GENERATING STATION
Original Filed Jan. 23, 1923
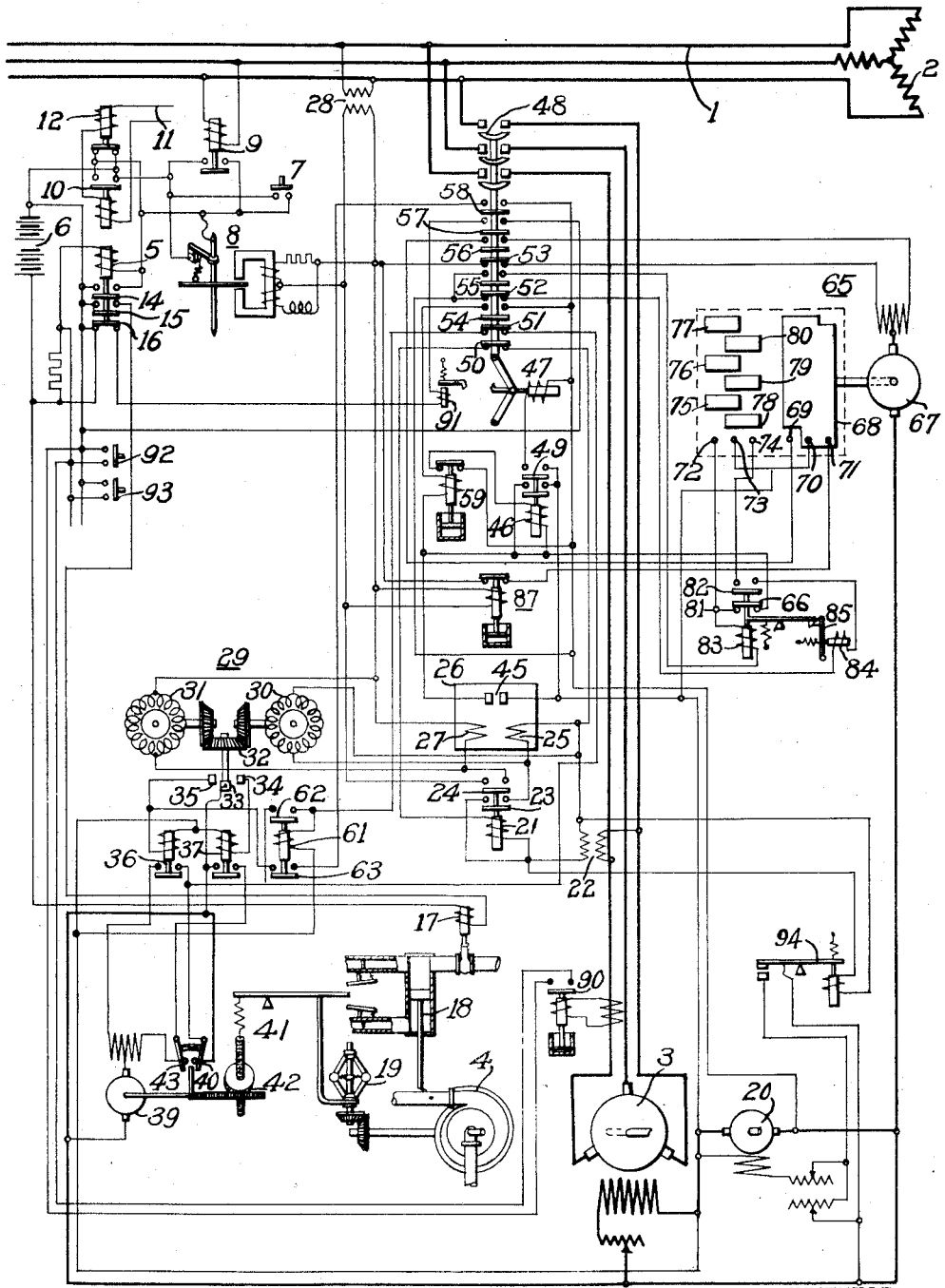
WITNESSES:
A.G. Schiefelbein
J.E. Foster
INVENTOR.
Roy J. Wensley.
BY
Wesley G. Carr
ATTORNEY Patented Oct. 27, 1931

1,829,427

UNITED STATES PATENT OFFICE

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA

AUTOMATIC HYDROELECTRIC GENERATING STATION

Application filed January 23, 1923, Serial No. 614,391. Renewed July 16, 1929.

My invention relates to automatic systems and particularly to automatic hydro-electric stations.

One object of my invention is to provide a control system for a hydro-electric station whereby, upon the occurrence of a predetermined condition in the power system, in the station, or in response to a controlling impulse from a distance, the generator may be automatically started from rest and synchronized with, and connected to, the system.

Another object of my invention is to provide a control system of the above indicated character in which an automatic reclosing control device is rendered effective when the voltage of the power system decreases to a predetermined value whereby the generator may be connected to the system a predetermined number of times and then locked out if an abnormal condition that was the cause of the reduced voltage persists on the system.

Another object of my invention is to provide a control system wherein a relatively small storage battery may be employed to provide energy for the initiating relay devices, and in which the control energy for the subsequently operating devices is supplied by an exciter which may be directly connected to the generator and water-wheel.

In practicing my invention, I provide an initiating relay which may be caused to operate in response to predetermined conditions in the line or in the station or upon reception of an impulse transmitted thereto either through the transmission system or through a separate control circuit.

Upon the actuation of the initiating relay the water-wheel governor is caused to operate to permit the actuation of the water-wheel and the gradual acceleration of the generator to substantially synchronous speed. After the voltage of the generator attains a predetermined value, an automatic syncronizing device becomes effective to control the connection of the generator to the transmission system.

In order to take care of a condition when the system may be disconnected from its main source of energy and have no voltage thereon, I provide an automatic reclosing relay which operates to connect the generator directly to the power system after it has attained synchronous speed independently of the control of the synchronizing device.

The single figure of the accompanying drawing is a diagrammatic view of an electrical system containing apparatus arranged to operate in accordance with my invention.

A power system 1 normally receives energy from a main source of energy 2 that is adapted to receive additional energy under predetermined conditions from a hydro-electric station containing a generator 3 that is actuated by a water-wheel 4. The initiation of the operation of the control apparatus of the hydro-electric station is procured by means of an initiating relay 5.

The relay 5 receives its energy from a small storage battery 6 and is controlled by any one of a plurality of switching devices that are responsive to different conditions, for example, a floating switch 7 that is responsive to the amount of water available, a frequency relay switch 8 responsive to the frequency of the system, a selector relay switch 9 that may be energized from a remote point through the transmission line, or, similarly, a relay 10 which may be energized through a common control circuit 11 that is employed to control a plurality of different hydro-electric stations.

An additional relay control switch 12 is provided to effect the automatic starting of the station if the control circuit 11 should become open or otherwise so affected as to preclude the control of the relay 10 from a remote point by a system supervisor. The relay 5 will be energized upon the operation of any one of the switching devices and will thereupon close two of its switches 14 and 15 and open a switch 16.

The switch 14 provides a holding circuit for the relay 5 and serves to maintain that relay energized independently of any subsequent fluctuations in the conditions that control the operation of the switching devices 7 to 12, inclusive.

The switch 15, when closed, is effective to energize a solenoid valve 17 for controlling the admission of oil to an oil control mechanism 18 associated with a governor 19 whereby the speed of the water-wheel 4 is regulated and controlled. The governor mechanism is illustrated schematically to show merely the control valve for the oil system.

When the valve 17 is open, the oil system operates to open the water-gates through well known governor control mechanism (not shown) and water is admitted to the wheel 4 to gradually accelerate the generator 3 to substantially synchronous speed.

As the generator is accelerated, its field winding is excited by a small exciter generator 20 and the voltage of the generator gradually increases. When the generator voltage attains a predetermined value, a voltage relay 21, that is energized from the generator 3 through a potential transformer 22, becomes sufficiently energized to close its two switches 23 and 24.

The switch 23 serves to connect a generator coil 25 of a synchronizing device 26 to the terminals of the secondary winding of the generator potential transformer 22. The switch 24, when closed, serves to connect the line coil 27 of the synchronizing device 26 to the terminals of a transformer 28 that is energized from the power system 1.

The switches 23 and 24, when closed, also simultaneusly complete the circuits of two synchronous motors 30 and 31, respectively, which are mechanically connected through differential gearing 32 to control the operation of a movable contact member 33. The motor 30 is energized from the generator and the motor 31 is energized from the power line. When the speed of the synchronous motor 30 exceeds the speed of the synchronous motor 31, the movable contact member 33 engages a stationary contact member 34. Similarly, when the speed of the synchronous motor 30 is less than the speed of the synchronous motor 31, the movable contact member 33 engages a stationary contact member 35. Thus, the contact member 33 will engage the contact member 34 when the electrical speed or frequency of the generator exceeds the frequency of the system, and it will engage contact member 35 when the frequency of the generator is less than the frequency of the system.

If the frequency of the generator is less than that of the system, the contact member 33, upon engaging the contact member 35, completes the energizing circuit of a raising control relay 36. Similarly, if the electrical speed of the generator exceeds that of the system, a lowering relay 37 is energized.

When the raising relay 36 operates, it completes the circuit of a reversible motor 39 through a limit switch 40 whereby the governor is regulated through a tension spring 41 to increase the speed of the water-wheel and, consequently, of the generator. The limit switch 40 serves to preclude movement of a controlling member 42 that is operated by the motor 39, beyond a predetermined extent.

If the speed of the generator should be increased above the electrical speed of the system, the relay 36 would be de-energized and the relay 37 re-energized to complete the circuit of the motor 39 through another limit switch 43 whereby operation of the motor 39 would be effected in a reverse direction. The governor 19 will thereupon be regulated to decrease the speed of the generator and such operations will continue until the speed of the generator corresponds directly to the electrical speed of the system.

When the condition of electrical synchronism between the generator and the system is attained and maintained for an interval of time, corresponding to that required for the operation of the synchronizing device 26, the closing of the synchronizing switch 45 completes the circuit of a relay 46 which operates to connect the closing coil 47 of the interrupter 48 to the terminals of the exciter 20 through a switch 49.

The interrupter 48 is thereupon closed and latched in closed position. When the interrupter is actuated, a plurality of interlock switches 50, 51, 52 and 53 are opened and a plurality of interlock switches 54, 55, 56, 57 and 58 are closed. The functions of these several switches will be hereinafter explained.

The switch 50, upon opening, de-energizes the voltage relay 21, thereby disconnecting the synchronizing device 26 and the speed control device 29 from the generator and the system. The switch 54, upon closing, completes the circuit of a cut-off relay 59 by connecting it across the terminals of the exciter through the synchronizing switch 45 to de-energize the operating coil of relay 46. The closing coil 47 is thereupon de-energized but the interrupter remains latched in its closed position. Immediately upon the opening of the synchronizing switch 45, the cut-off relay 59 is de-energized.

After the generator is connected to the system, it is desired that the governor be then adjusted to maintain a predetermined speed of the generator. A relay 61 is provided for this purpose which functions in the following manner. As the exciter voltage gradually increases, the operating coil of relay 61 becomes sufficiently energized to close its switch 62 which is connected in parallel with the interlock switch 51 of the main interrupter 48. The switch 62 co-operates with the limit switch 40 to complete its own holding circuit.

Upon the closing of the main circuit interrupter 48, the switch 51 is opened and the relay 61 thereupon depends upon its switch 62 and the limit switch 40 for the maintenance of its energizing circuit. Immediately upon its actuation, however, and the closing of its switch 63, a circuit is completed by the latter in co-operation with the switch 58 of the interrupter to connect the operating coil of the raising relay 36 to the terminals of the exciter. The motor 39 is thereupon actuated to adjust the governor to the limit at which the limit switch 40 is set.

The relay switch 40 for the motor 39 is thereupon opened and the relay 61 consequently is disconnected from the exciter terminals and is de-energized. The switches 62 and 63 are thereupon opened and the relay 36 is de-energized. The governor is now removed from the control of the speed controlling devices until the main interrupter 48 is opened for some reason, or until an inspector visits the station and regulates the governor through the motor by any suitable means that may be provided.

If, for any reason, such as the occurrence of a heavy short-circuit or the disconnection of the system from the main source of energy, the voltage of the system should decrease to a relatively small value, it is desired to connect the generator to the system immediately without waiting for the functioning in the synchronizing apparatus. To this end, I employ a reclosing relay system that constitutes the subject matter of a patent application of H. A. Travers for Periodic reclosing circuit breakers; Serial No. 610,784, filed Jan. 5, 1923, now Patent No. 1,788,134, Jan. 6, 1931, and assigned to the Westinghouse Electric & Manufacturing Company.

The system referred to comprises a reversible motor relay 65 and a set-up relay 66. The motor relay 65 comprises a reversible motor 67, a limit switch 68 arranged to co-operate with three contact members 69, 70 and 71 to control the circuit of the motor 67, and a plurality of segments arranged to co-operate with three contact members 72, 73 and 74 to control the actuation of the set-up relay 66. The control segments comprise three operating segments 75, 76 and 77 and three reset segments 78, 79 and 80, respectively. The set-up relay comprises a switch 81 normally closed, a switch 82 normally open, an operating relay 83, a reset coil 84 and a latching member 85.

Assuming the condition that the generator is not connected to the system and the voltage of the system suddenly decreases to the predetermined value, a voltage relay 87 operates to close its switch which co-operates with switch 53 of the circuit interrupter and limit switch 68, including contact members 70 and 71, of the motor relay 65, to connect the motor 67 across the terminals of the exciter. The motor thereupon actuates the drum upon which the limit switch and the segments are mounted in a forward or downward direction.

Upon engagement of the contact members 73 and 74 by the segments 78, the reset coil 84 is energized through the switch 82 if the set-up relay is in its latched position, thereby permitting the set-up relay 66 to be actuated to its normal position in which the main switch 81 is closed. The motor continues to operate the drum until the first operating segment 75 engages the contact members 72 and 73, whereupon a circuit is completed through the segment 75, the switch 81 of the set-up relay 66, coil of relay 46, and the switch of the relay 59 to energize the closing coil of relay 46. The interrupter is thereupon closed.

If the failure of line voltage had been caused by the disconnection of the main source of energy from the system and there is no faulty condition on the system, the interrupter 48 will remain closed. If, however, the reduced voltage had been caused by a short-circuit condition, the generator 3 will tend to supply excessive currents to the system and an overload relay 90 will operate to short-circuit the initiating relay 5, thereupon effecting the opening of its switches 14 and 15 and closing of its switch 16. Switch 16, in closing, will co-operate with the switch 57 of the interrupter to energize the trip coil 91 of the interrupter to effect the opening of the interrupter.

Upon the re-opening of the interrupter, the control apparatus will immediately reset itself to permit the continued actuation of the waterwheel and the generator, since the frequency relay 8 will be closed to permit the re-energization of the initiating relay 5.

Upon the re-opening of the interrupter, the reclosing of the switch 53 will effect the energization of the motor 67 to continue the actuation of the drum in the forward or downward direction. During the brief interval that the circuit interrupter had remained closed while the overload relay 90 was being operated, the switch 55 co-operated with the segment 75 to complete the energizing circuit of the operating coil 83 of the set-up relay 66. Upon the closing of the interrupter, the relay 66 was therefore actuated away from its biased position, thus closing switch 82 and opening switch 81.

When the interrupter reopens and effects a continued operation of the motor relay 65, the reset segment 79, upon engagement with the contact members 73 and 74, co-operates with the switch 82 of the set-up relay 66 and the switch 52 of the interrupter to energize the reset coil 84 which actuates the latching member 85 to permit the actuation of the set-up relay to its initial position. Continued movement of the relay 65 effects the engagement of the contact members 72 and 73 by the second operating segment 76, whereupon the closing coil of the relay 46 is again energized to effect the closing of the interrupter.

If the short circuit still persists, the interrupter will, of course, be opened again and the same reclosing operation will be effected when the third operating segment 77 recloses the interrupter a third time. Under such conditions, the set-up relay 66 will again be actuated to its latched position and the limit switch 68 will have passed beyond the contact member 71, thereby precluding further operation of the motor 67 in the forward direction. No further reclosures of the interrupter can now be effected by the reclosing relay 65.

If, after any one of the reclosures of the interrupter, the faulty condition should have been cleared before the overload relay effected the reopening of the interrupter, the motor relay 65 would be reset in its initial position by being energized in the reverse direction through the limit switch 68 and contact members 69 and 70 in co-operation with the switch 56 of the interrupter.

If the trouble upon the system should be cleared or the main source of energy re-connected thereto to restore energy to the system, the relay 87 will be energized to preclude forward operation of the motor while voltage obtains on the system.

Upon any subsequent closure of the interrupter to connect the generator to the system either in response to a load demand predetermined water level or selective impulse from a remote point of control, the reclosing relay 65 would be similarly reset in its initial position upon the closure of the interrupter 48.

The generator may be disconnected from the system upon the occurrence of any predetermined abnormal condition within the system, such as abnormal temperature conditions, excessive overload or other similar conditions for which protection may be desired. Switches 92 and 93 are indicative of such protective devices and they may be caused to respond to any of the abnormal conditions against which it is desired to protect the apparatus.

A voltage regulator 94 is provided to control the generator voltage by regulating the excitation of the exciter field winding.

It will be observed that my invention contemplates the initiation of the control apparatus in response to any one of a number of predetermined conditions; that the control energy for the initiating devices is to be derived from a relatively small storage battery to start the energy-translating unit after which the control energy is to be derived from the exciting generator.

It will be observed also that my invention contemplates the automatic synchronizing of the generator with the system to which it is to be connected while there is voltage on the system, and the immediate direct connection to the system in accordance with a predetermined cycle of operations when the system loses its voltage.

My invention is not limited to the specific devices or the arrangement thereof, since various modifications may be made therein without departing from the spirit and scope of my invention, as set forth in the appended claims.

I claim as my invention:

1. The combination with an alternating-current distribution system, a generator for supplying electrical energy thereto, a prime mover for the generator and a source of energy for driving the prime mover, of means responsive to predetermined conditions for automatically starting the generator from rest, means controlled by the generator electromotive force for synchronizing the generator with the system, and means controlled by the synchronizing means for connecting the generator to the system and controlling the amount of energy supplied to the prime mover to cause the generator to assume a portion of the load on the system.

2. The combination with an alternating-current distribution system, a generator for supplying electrical energy thereto, a prime mover for the generator and a source of energy for driving the prime mover, of means responsive to predetermined conditions for automatically starting the generator from rest, means controlling by the generator electromotive force for synchronizing the generator with the system, and means controlled by the synchronizing means for connecting the generator to the system.

3. The combination with an alternating-current distribution system, a generator for supplying electrical energy thereto, a prime mover for the generator and a source of energy for driving the prime mover, of means responsive to a predetermined condition for controlling the supply of energy to the prime mover to start the generator and accelerate it to substantially synchronous speed, automatic synchronizing means for synchronizing the generator to the system and then connecting the generator thereto, and means responsive to the generator electromotive force for controlling the synchronizing means.

4. The combination with an alternating-current distribution system, a generator for supplying electrical energy thereto, a prime mover for the generator and a source of energy for driving the prime mover, of means responsive to a predetermined condition for controlling the supply of energy to the prime mover to start the generator and accelerate it to substantially synchronous speed, automatic synchronizing means for synchronizing the generator to the system and then connecting the generator thereto, and means responsive to the generator electromotive force for rendering the synchronizing means effective.

5. The combination with an alternating-current distribution system, a generator for supplying electrical energy thereto, a prime mover for the generator and a source of energy for driving the prime mover, of means responsive to a predetermined condition for controlling the supply of energy to the prime mover to start the generator and accelerate it to substantially synchronous speed, automatic synchronizing means for synchronizing the generator to the system and then connecting the generator thereto, and means compriisng a device responsive to the generator electromotive force for rendering the synchronizing means operative after a predetermined electromotive force is developed and until the generator is connected to the system.

6. The combination with an alternating-current distribution system, a generator for supplying electrical energy thereto, a prime mover for the generator and a source of energy for driving the prime mover, of means responsive to a predetermined condition for controlling the automatic starting of the generator from rest, means dependent upon the generator electromotive force for controlling the automatic synchronizing of the generator with the system, and means controlled by the synchronizing means for connecting the generator to the system and for controlling the supply of energy to the prime mover to cause the generator to assume a portion of the load on the system.

7. The combination with an alternating-current distribution system, a generator for supplying electrical energy thereto, a prime mover for the generator and a source of energy for driving the prime mover, of a governor for automatically controlling the speed of the prime mover, an electromagnetic device for rendering the governor operative to start and accelerate the generator to substantially synchronous speed, an automatic synchronizer, means responsive to the generated electromotive force for rendering the synchronizer operative, a governor motor, means controlled by the synchronizer for regulating the governor by means of the motor to synchronize and connect the generator to the system, and means operative after the connection of the generator to the system for transferring entirely the controlling influence to the governor.

8. The combination with an alternating-current distribution system, a generator for supplying electrical energy thereto, a prime mover for the generator and a source of energy for driving the prime mover, of electromagnetic means for automatically starting the generator from rest, bringing it into step with the system and then connecting it thereto and controlling the amount of energy supplied to the prime mover to cause the generator to assume a portion of the load on the system, said electromagnetic means being dependent, in a predetermined sequence of operations, upon the proper completion of a preceding operation in said sequence and upon predetermined coincident condition of the system, of the generator and of the prime mover.

9. The combination with an alternating-current distribution system, a generator for supplying electrical energy thereto, a prime mover for the generator and a source of energy for driving the prime mover, of means for automatically starting the generator from rest, synchronizing the generator with the system and then connecting the generator to the system, and a plurality of electromagnectic controlling devices for controlling said automatic means, the operation of the respective controlling devices being a direct function of a coincident electrical condition of the generator and being dependent upon the proper functioning of the preceding operation in the sequence.

10. The combination with an alternating-current distribution system, a generator for supplying electrical energy thereto, a prime mover for the generator and a source of energy for driving the prime mover, of means for automatically starting the generator from rest, synchronizing the generator with the system and then connecting the generator to the system, and a plurality of electromagnetic controlling devices for controlling said automatic means, the operation of the respective controlling devices being a direct function of a coincident electrical condition of the generator and the system, and dependent upon the proper functioning of the preceding operation in the sequence.

11. A control system for a fluid motor-driven generator comprising means for starting the generator from rest, synchronizing and then connecting the same to an electrical system, and then causing the generator to assume a portion of the load, said means comprising relay-controlled means operative in a predetermined sequence and provided with operating windings and switches, and means for connecting the switches and the operating windings of the succeeding means in the predetermined sequence to cause the energization and consequent actuation of the several means directly upon the actuation of the preceding means in the predetermined sequence.

12. The combination with an alternating-current distribution system, a generator for supplying electrical energy thereto, a prime mover for the generator and a source of energy for driving the prime mover, of means for automatically starting the generator from rest, bringing it into step with the system and then connecting it thereto and controlling the amount of energy supplied to the prime mover to cause the generator to assume a portion of the load on the system, and relay-controlled means operative in a predetermined sequence for controlling said operation of the generator, in which sequence the respective means are dependent for their operation only upon the completion of the operation of the preceding means in said sequence.

13. The combination with an alternating-current distribution system, a generator for supplying electrical energy thereto, a prime mover for the generator and a source of energy for driving the prime mover, of means for initiating the operation of the prime mover and the generator in response to predetermined conditions, means operative when such operation is initiated to the effect synchronizing of predetermined electrical characteristics of the generator with the corresponding characteristics of the distribution system, and means operative when such synchronizing is accomplished to connect the generator to the distribution system.

14. An automatic generating station comprising, in combination, a distribution system, means for imposing power of a predetermined frequency on the distribution system, a power-driven generator disposed to be connected to the distribution system, and means automatically operable upon a predetermined change in frequency of the power flowing in the distribution system to initiate the operation of the power-driven generator and accelerate it to a speed at which it generates a voltage in synchronism with that of the distribution system.

15. An automatic generating station comprising, in combination, a power-transmission system, means for supplying power of predetermined frequency to the power-transmission system, a generator disposed to be connected to the power-transmission system, a turbine for driving the generator, a governor for controlling the speed of the turbine, means automatically operable in response to system conditions disposed to control the governor to initiate the operation of the turbine, means including synchronous motors energized by the voltages of the generator and system, and a differential mechanism jointly driven by the motors for controlling the governor to accelerate the generator to a speed at which its voltage is in synchronism with the voltage of the power-transmission system.

In testimony whereof, I have hereunto subscribed my name this 11th day of January, 1923.

ROY J. WENSLEY.